(12) United States Patent
Berning et al.

(10) Patent No.: US 9,896,810 B2
(45) Date of Patent: Feb. 20, 2018

(54) METHOD FOR CONTROLLING A SELF-PROPELLED CONSTRUCTION MACHINE TO ACCOUNT FOR IDENTIFIED OBJECTS IN A WORKING DIRECTION

(71) Applicant: Wirtgen GmbH, Windhagen (DE)

(72) Inventors: Christian Berning, Zulpich (DE); Matthias Fritz, Linz (DE); Cyrus Barimani, Konigswinter (DE)

(73) Assignee: Wirtgen GmbH (DE)

( * ) Notice: Subject to any disclaimer, the term of this patent is extended or adjusted under 35 U.S.C. 154(b) by 191 days.

(21) Appl. No.: 14/835,481

(22) Filed: Aug. 25, 2015

(65) Prior Publication Data

US 2016/0060820 A1     Mar. 3, 2016

(30) Foreign Application Priority Data

Aug. 28, 2014  (DE) .................. 10 2014 012 831

(51) Int. Cl.
*E01C 19/00* (2006.01)
*E01C 23/01* (2006.01)
(Continued)

(52) U.S. Cl.
CPC ............ *E01C 19/004* (2013.01); *E01C 19/05* (2013.01); *E01C 19/264* (2013.01); *E01C 19/266* (2013.01); *E01C 19/268* (2013.01); *E01C 19/48* (2013.01); *E01C 23/01* (2013.01); *E01C 23/088* (2013.01); *H04N 5/23293* (2013.01); *H04N 7/183* (2013.01)

(58) Field of Classification Search
CPC .................................................... E01C 19/004

USPC ......... 404/84.05, 84.5; 299/1.05, 1.4; 172/5; 37/38

See application file for complete search history.

(56) References Cited

U.S. PATENT DOCUMENTS 4,065,856 A * 1/1978 Waters .................... E01B 35/00
                                                       104/7.1
5,245,422 A * 9/1993 Borcherts ............ G05D 1/0246
                                                       348/119
(Continued)

FOREIGN PATENT DOCUMENTS

DE        19750315 A1    5/1998
DE        29918747 U1    2/2000
(Continued)

*Primary Examiner* — Gary S Hartmann

(74) *Attorney, Agent, or Firm* — Lucian Wayne Beavers; Gary L. Montle; Patterson Intellectual Property Law, PC

(57) ABSTRACT

A self-propelled construction machine has an image capturing unit for capturing an image of the terrain, a display unit on which the captured image is displayed, and a data processing unit. In the displayed image, objects that are relevant to the building project, for example manhole covers, water inlets or curbs, are identified and a spatial data set containing information regarding the position of the identified objects in a reference system which is independent of the movement of the construction machine is determined from the image data of the capturing unit. The construction machine is then controlled in order to carry out translational and/or rotational movements on the terrain and/or to install a structure on the terrain or to alter the terrain on the basis of the spatial data set. As a result, the previously identified objects can be taken into account in the building project.

18 Claims, 8 Drawing Sheets

(51) Int. Cl.
*E01C 19/05* (2006.01)
*E01C 19/26* (2006.01)
*E01C 19/48* (2006.01)
*H04N 5/232* (2006.01)
*H04N 7/18* (2006.01)
*E01C 23/088* (2006.01)

(56) References Cited

U.S. PATENT DOCUMENTS

| | | | |
|---|---|---|---|
| 5,288,167 A | | 2/1994 | Gaffard et al. |
| 5,519,620 A | | 5/1996 | Talbot et al. |
| 5,546,123 A | * | 8/1996 | Ikeda ............ E01C 19/006 348/119 |
| 5,549,412 A | | 8/1996 | Malone |
| 5,612,864 A | | 3/1997 | Henderson |
| 5,631,658 A | | 5/1997 | Gudat et al. |
| 5,721,685 A | * | 2/1998 | Holland ............ E01B 35/02 342/357.31 |
| 5,838,277 A | | 11/1998 | Loomis et al. |
| 5,929,807 A | | 7/1999 | Viney et al. |
| 6,027,282 A | | 2/2000 | Horn |
| 6,047,227 A | | 4/2000 | Henderson et al. |
| 6,074,693 A | | 6/2000 | Manning |
| 6,088,644 A | | 7/2000 | Brandt et al. |
| 6,113,309 A | | 9/2000 | Hollon et al. |
| 6,140,957 A | | 10/2000 | Wilson et al. |
| 6,144,318 A | | 11/2000 | Hayashi et al. |
| 6,152,648 A | | 11/2000 | Gfroerer et al. |
| 6,191,732 B1 | | 2/2001 | Carlson et al. |
| 6,287,048 B1 | | 9/2001 | Hollon et al. |
| 6,307,959 B1 | * | 10/2001 | Mandelbaum ...... G06T 7/207 382/104 |
| 6,371,566 B1 | | 4/2002 | Haehn |
| 6,425,186 B1 | | 7/2002 | Oliver |
| 6,481,924 B1 | | 11/2002 | Smolders et al. |
| 6,553,299 B1 | * | 4/2003 | Keller ............ A01B 79/005 111/200 |
| 6,655,465 B2 | | 12/2003 | Carlson |
| 6,736,216 B2 | | 5/2004 | Savard |
| 6,769,836 B2 | | 8/2004 | Lloyd |
| 6,916,070 B2 | | 7/2005 | Sehr |
| 6,950,059 B2 | | 9/2005 | Rapoport |
| 6,963,657 B1 | * | 11/2005 | Nishigaki ............ G01S 11/12 340/901 |
| 7,002,513 B2 | | 2/2006 | Brabec |
| 7,029,199 B2 | | 4/2006 | Mayfield et al. |
| 7,068,815 B2 | * | 6/2006 | Chang ............ G06K 9/00624 382/103 |
| 7,363,154 B2 | | 4/2008 | Lindores |
| 7,399,139 B2 | | 7/2008 | Kieranen |
| 7,443,167 B2 | | 10/2008 | Siegel et al. |
| 7,491,014 B2 | | 2/2009 | Sick |
| 7,510,347 B2 | | 3/2009 | Lemke |
| 7,530,641 B2 | | 5/2009 | Berning et al. |
| 7,617,061 B2 | | 11/2009 | Brabec |
| 7,643,923 B2 | | 1/2010 | Buehlmann et al. |
| 7,856,302 B2 | | 12/2010 | Rasmussen |
| 7,865,285 B2 | * | 1/2011 | Price ............ E02F 3/434 172/4.5 |
| 7,946,787 B2 | | 5/2011 | Glee et al. |
| 7,946,788 B2 | | 5/2011 | Jurasz et al. |
| 8,018,376 B2 | | 9/2011 | McClure |
| 8,047,741 B2 | * | 11/2011 | Von Schonebeck .. E01C 19/004 299/39.4 |
| 8,174,437 B2 | | 5/2012 | Whitehead |
| 8,246,270 B2 | | 8/2012 | Berning et al. |
| 8,271,194 B2 | | 9/2012 | Whitehead |
| 8,388,263 B2 | | 3/2013 | Fritz et al. |
| 8,412,418 B2 | * | 4/2013 | Kumagai ............ E02F 3/7618 382/154 |
| 8,613,566 B2 | | 12/2013 | Fritz et al. |
| 8,676,508 B2 | * | 3/2014 | Schwarz ............ B60W 40/072 342/70 |
| 8,794,868 B2 | * | 8/2014 | Fritz ............ E01C 19/006 404/84.5 |
| 8,977,442 B2 | | 3/2015 | Menzenbach et al. |
| 8,989,968 B2 | | 3/2015 | Fritz et al. |
| 9,002,565 B2 | * | 4/2015 | Jones ............ A01B 69/007 342/357.39 |
| 9,036,865 B2 | * | 5/2015 | Haas ............ G06T 7/74 382/103 |
| 9,096,977 B2 | | 8/2015 | Fritz et al. |
| 9,347,185 B2 | * | 5/2016 | Reda ............ E01C 11/005 |
| 2004/0057795 A1 | | 3/2004 | Mayfield et al. |
| 2004/0193348 A1 | | 9/2004 | Gray et al. |
| 2008/0208417 A1 | | 8/2008 | Buehlmann et al. |
| 2008/0253834 A1 | | 10/2008 | Colvard |
| 2009/0016818 A1 | | 1/2009 | Hall et al. |
| 2010/0023229 A1 | | 1/2010 | Chiocco |
| 2011/0150572 A1 | | 6/2011 | Fritz et al. |
| 2011/0206456 A1 | | 8/2011 | Jurasz et al. |
| 2011/0229264 A1 | | 9/2011 | Weiser |
| 2012/0001621 A1 | | 1/2012 | Hall et al. |
| 2012/0001638 A1 | | 1/2012 | Hall et al. |
| 2012/0101725 A1 | | 4/2012 | Kondekar |
| 2012/0301220 A1 | | 11/2012 | Snoeck et al. |
| 2014/0081532 A1 | | 3/2014 | Fritz et al. |
| 2015/0176990 A1 | | 6/2015 | Fritz et al. |
| 2016/0060826 A1 | * | 3/2016 | Berning ............ E01C 23/088 299/1.5 |

FOREIGN PATENT DOCUMENTS

| | | |
|---|---|---|
| DE | 69131837 T2 | 6/2000 |
| DE | 102010014695 A1 | 10/2011 |
| DE | 102010048185 A1 | 4/2012 |
| EP | 1103659 A2 | 5/2001 |
| EP | 1118713 A1 | 7/2001 |
| EP | 2336424 A2 | 6/2011 |
| EP | 2719829 A1 | 4/2014 |
| WO | 9203701 A1 | 3/1992 |

* cited by examiner

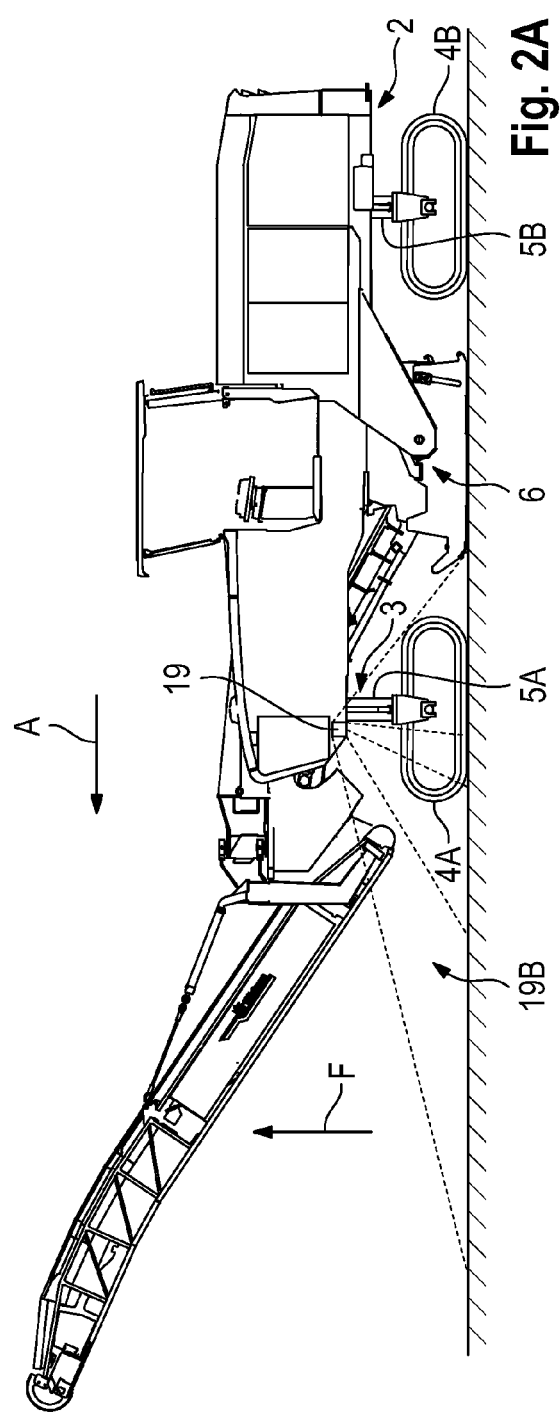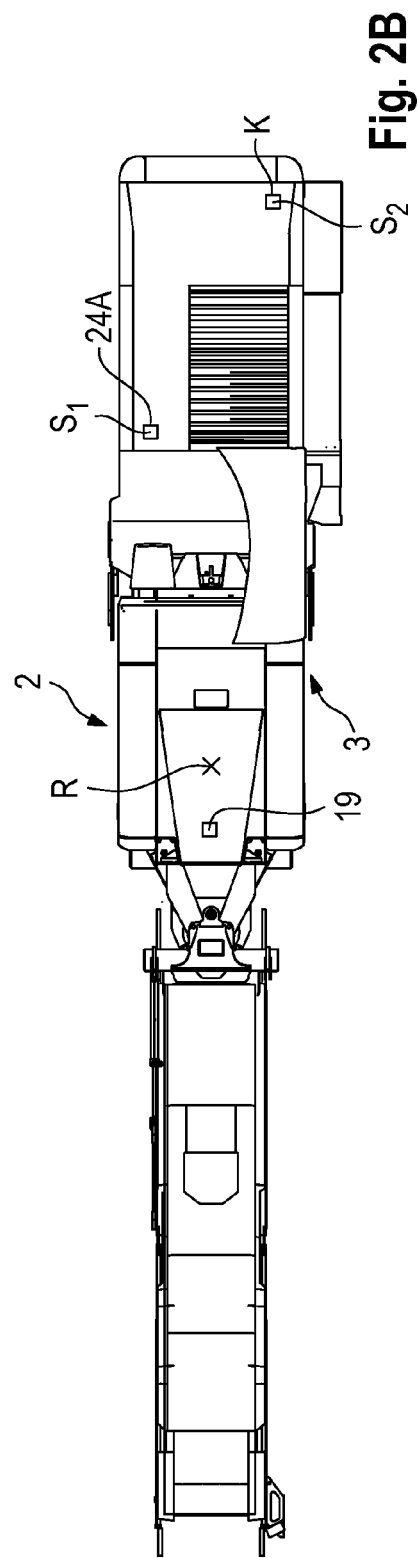

METHOD FOR CONTROLLING A SELF-PROPELLED CONSTRUCTION MACHINE TO ACCOUNT FOR IDENTIFIED OBJECTS IN A WORKING DIRECTION

BACKGROUND OF THE INVENTION

1. Field of the Invention

The invention relates to a self-propelled construction machine, in particular a road milling machine or a slipform paver, which has a chassis having front and rear wheels or running gears in the working direction, a drive device for driving the front and rear wheels or running gears, and a working device, the construction machine being able to carry out translational and/or rotational movements on the terrain and to install structures on the terrain or to alter the terrain in a predetermined working region. The invention further relates to a method for controlling a self-propelled construction machine.

2. Description of the Prior Art

Various types of self-propelled construction machines are known, including in particular the known road milling machines or slipform pavers. These construction machines are distinguished in that they have a working device for installing structures on the terrain or for altering the terrain.

In the known road millers, the working device comprises a milling roller which is equipped with milling cutters and with which material can be milled away from the road surface. The slipform pavers have a device for moulding fluid material, in particular concrete, which is also referred to as a concrete trough. The concrete trough allows structures of various designs to be produced, for example guiding walls or gutters.

When planning and carrying out the building project using the known construction machines, the problem arises whereby objects already present in the terrain, e.g. drains or manhole covers, have to be taken into account. The structure should, for example, not be located on top of a drain, or material should not be milled away from the region of the terrain in which for example a manhole cover is located.

To take account of objects present in the terrain, an intervention has to be made in the machine control. For example, when travelling over a manhole cover, the milling roller of a road milling machine has to be raised relative to the surface to be altered from a predetermined position, taking into account a margin of safety within a predetermined route, which is dependent on the dimensions of the manhole cover. In practice, however, the machine operator cannot see the exact position of the manhole cover at the level of the milling roller since the milling roller is below the cab. Therefore, in practice, the position of a manhole cover in the terrain is marked by lateral lines which are visible to the machine operator or to another person. However, marking objects present in the terrain proves to be disadvantageous in practice. Firstly, marking the objects necessitates an additional work step. In addition, it is difficult to draw the lines at a precise right angle to the direction of travel. Moreover, in darkness, the lines cannot be seen or can only be seen with difficulty. Furthermore, it is not easy to mark the objects when it is raining. Owing to the lack of accuracy, it is therefore necessary to select a relatively high margin of safety, which makes more extra work necessary.

When altering the terrain or installing structures on the terrain, the problem also arises of controlling the movement of the construction machine on the terrain while taking into account objects present in the terrain. For example, the construction machine should move at a predetermined distance along a curb to the side thereof.

Various devices for controlling construction machines which aim to make the works easier to plan and carry out are known.

DE 10 2010 048 185 A1 describes a device for making it easier to maneuver a manually controlled construction machine on the terrain, which machine detects, by means of sensors, the steering angle of the running gears as set by the machine operator. The maneuvering device then calculates the trajectories describing the route of the construction machine, which are displayed to the machine operator on a display unit.

EP 2 336 424 A2 describes a self-propelled construction machine which has a unit for determining data describing a target curve in a reference system which is independent of the position and orientation of the construction machine, and a control unit which is designed such that a reference point on the construction machine moves on the target curve starting from a predetermined starting point at which the construction machine has a predetermined position and orientation on the terrain.

EP 2 719 829 A1 discloses a method for controlling a construction machine, in which the data describing a target curve in a reference system which is independent of the position and orientation of the construction machine are determined by means of a measuring apparatus (rover) on the terrain and input into a working memory of the construction machine.

US 2009/0016818 A1 and US 2012/0001638 A1 describe construction machines which have a device for detecting metal objects which may be located below the terrain surface. If an object made of metal is detected, the road milling machine can be stopped or the milling roller can be raised. The objects buried in the terrain can be detected by a metal detector.

SUMMARY OF THE INVENTION

The object of the invention is to provide a self-propelled construction machine, by which the control of the construction machine is simplified in practice while taking account of objects present in the terrain. Another object of the invention is to disclose a method, by which the control of the construction machine can be simplified while taking account of objects present in the terrain.

These objects are achieved according to the invention by the features of the independent claims. The subjects of the dependent claims relate to preferred embodiments of the invention.

The construction machine according to the invention is a self-propelled construction machine having a working device for installing structures on the terrain, for example a device for moulding concrete, or a device for altering the terrain, for example a milling roller. The working device is formed such that the structure is installed on the terrain within a predetermined working region or the terrain is altered within a predetermined working region. The detailed design of the working device is unimportant for the invention. The construction machine can, for example, be a road milling machine or a slipform paver. It can also be a road finisher or a roller, in which the same problem arises of taking account of objects present in the terrain.

The construction machine has an image capturing unit or image recording unit for capturing an image of the terrain. The captured image shows a portion of the terrain located in a coordinate system which is dependent on the position and orientation of the construction machine on the terrain, since the image capturing unit moves together with the construction machine on the terrain. The image detail should be selected such that any region that is relevant for controlling the construction machine is recorded, it also being possible for the image detail to include regions which the machine operator cannot see from the cab. As a result, the view of the machine operator is expanded. The image capturing unit can comprise one or more cameras. If the image capturing unit comprises a plurality of cameras, the overall image can be assembled from the images from the individual cameras.

In addition, the construction machine has a display unit on which the captured image is displayed. The image can, for example, be displayed on a display which can also be designed as a touch screen.

The image data from the image capturing unit are processed in a data processing unit, which comprises an identification unit and a referencing unit. The data processing unit can be a part of the central control, calculation and/or evaluation unit of the construction machine or form a separate unit. It can have a microprocessor on which a data processing program (software) runs.

The construction machine according to the invention and the method according to the invention for controlling the construction machine are based on the identification of one or more objects in the terrain that are relevant for the building project, for example manhole covers, water inlets or curbs which are represented in the image displayed on the display unit. For this purpose, the data processing unit has the identification unit, by which an object can be identified by the machine operator himself, with the aid of the identification unit, or completely automatically without the machine operator. In this context, identification of an object is understood to mean selection of an object. If one or more objects are selected from a plurality of different objects, the identification of the object can also include the definition of the type of object. The visualisation of an actual image of the surroundings allows the objects to be identified immediately before beginning the works or during the works, so that the works can be planned and carried out at the same time or immediately following one another and account can also be taken of alterations to the surroundings that appear with little notice. The works to be carried out in a following step can be planned while the works that have been planned in a preceding step are being carried out.

In this context, the objects relevant for the building project are understood to be all objects that affect either the position of a structure to be installed on the terrain or the state of the portion of the terrain to be altered. In the simplest and most general case, a single point can represent an object within the meaning of the invention. The single point can, for example, be an image point (pixel) in an image which is assembled from a plurality of pixels. Then, the identification of the object is the selection of a pixel from the plurality of pixels in the image. A mouse can then be used, for example, to click on said pixel. The image point can, however, also comprise a plurality of pixels.

If the objects are points, the points can be used, for example, to establish the course of the terrain portion which is to be altered or on which a structure is intended to be installed or, alternatively, which is not intended to be altered or is not intended to be built upon. For example, the building project can consist in using a road milling machine to mill away the road surface next to a curb. In this case, the objects to be identified can, for example, be points along the curb edge. The objects to be identified can, however, also be lines, for example a start line, an end line, one or more boundary lines of an object, the contour of an object or the surface area occupied by the object in the terrain. In this case, the objects themselves can be marked by points which will be referred to as object points in the following. A boundary line can, for example, be marked by two points, for example the start and end point thereof. In this way, it is possible, for example, to identify problematic objects located in a terrain portion on which a structure is intended to be built or which is intended to be altered. For example, it is possible to identify the manhole covers located in the terrain portion which is to be milled away by a road milling machine.

It is preferable for the invention that a spatial data set containing information regarding the position of the identified objects in a reference system which is independent of the movement of the construction machine is determined from the image data of the capturing unit. As a result, project data, by means of which a project can be carried out immediately after the image is captured, can be generated from currently available image data.

The spatial data set is determined on the basis of the position and orientation of the image capturing unit in the reference system which is independent of the movement of the construction machine. For this purpose, the data processing unit has the referencing unit. On the basis of the determined spatial data set which describes the location of the identified objects in a stationary reference system in which the construction machine moves, the construction machine is then controlled in order to carry out translational and/or rotational movements on the terrain and/or to install a structure on the terrain or to alter the terrain. As a result, the previously identified objects can be taken into account in the building project.

The spatial data set can be determined using the known methods for image measurement (photogrammetry) and georeferencing, by means of which spatial information is assigned to the image data from the image capturing unit in order to generate the spatial data set. To identify the objects, the known image recognition methods can be used.

The position of the objects represented in the image plane of the image capturing unit or of the objects displayed on the display unit can be delineated by image coordinates of the image plane of the image capturing unit or image coordinates of the display unit. For example, the position of each image point (pixel) is clearly defined by an image coordinate of the captured image. The referencing unit is preferably configured such that image coordinates of the image of object points on the identified objects in the image displayed on the display unit are allocated location coordinates in the reference system which is independent of the movement of the construction machine. The position of a circular manhole cover can, for example, be clearly delineated by three object points located on the contour thereof. The referencing unit can define the image coordinates of these object points and can define the location coordinates of the object points in the stationary coordinate system on the basis of the known spatial relationship between the coordinate system relating to the construction machine and the coordinate system which relates to the terrain and is independent of the movement of the construction machine.

A preferred embodiment of the invention provides for the identification unit to comprise an input unit which is configured such that, in order to identify an object in the image displayed on the display unit, at least one object point on the object to be identified can be marked. When a touch screen is used, the display unit and input unit can form one unit. The machine operator can then identify the object by touching the touch screen.

The object can be identified by marking one or more object points which are located on a boundary line or a contour of the object. If the shape of the object is known, a relatively low number of object points can be used to precisely delineate the object in the image plane. The contour of a circular manhole cover is, for example, clearly defined by three object points located on the contour. The contour in turn clearly defines the spatial extent of the object (surface area). A rectangular duct cover is, for example, clearly defined by the corner points thereof. The lateral boundary of a building project as a result of curbs can be specified by a line which extends through a plurality of object points arranged at a distance from one another. A higher number of reference points increases the accuracy of the position determination.

A particularly preferred embodiment provides an input unit which is configured such that an object can be selected from a plurality of objects of a predetermined shape, for example a circle for a manhole cover or a rectangle for a water inlet, the identification unit being configured such that the object is identified on the basis of the selection of both a particular object and the at least one marked object point. If the machine operator has already seen on the image that the object is, for example, a circular manhole cover, said user can make an appropriate selection, i.e. can input a manhole cover as the detected object on the input unit. In practice, the objects to be identified are standardised objects of which the geometric dimensions are known. If the dimensions of the objects are known, for example the diameter of the selected manhole cover, it is sufficient to only mark the center of the manhole cover as the object point in order to mark the contour of the manhole cover and to define the surface area thereof in the image plane. For this purpose, at least one reference point to be marked is allocated to the standardised object.

Another preferred embodiment provides an image recognition unit which is configured such that, in order to identify an object in the image displayed on the display unit, objects of a predetermined shape can be recognised. This embodiment allows for an object to be identified completely automatically without the machine operator, in that the objects of which the shape and dimensions are known, for example round manhole covers or rectangular water inlets, are recognised by the image recognition unit. However, using the image recognition, it is also only possible to make a pre-selection, which still has to be confirmed by the machine operator.

The identification unit can have both an input unit for selecting an object and an image recognition unit. This allows the identification to be simplified further or the accuracy during the identification to be increased as a result of a greater level of redundancy.

The type of control of the construction machine on the basis of the spatial data set is determined by the respective building project and the type of construction machine. In a road milling machine, the working device is a milling roller which is vertically adjustable relative to the ground in order to alter a predetermined portion of the terrain, while the working device in a slipform paver is a device for moulding concrete.

In a preferred embodiment of the invention, which is advantageous in both a road milling machine and a slipform paver, the control unit comprises an arithmetic and evaluation unit which is configured such that a comparison is made between the position of the working region of the working device and the position of the object in the reference system which is independent of the movement of the construction machine. The control unit of the construction machine is configured such that control signals for actuating the drive device are generated so that the drive device carries out translational and/or rotational movements in such a way that, during the advance of the construction machine, the working region of the working device is at a predetermined distance from the object. Thus, the construction machine can for example follow the course of curbs on the terrain, the lateral boundary lines of which can be marked as an object by the machine operator in the image by means of a plurality of object points. Instead of electric control signals for automatically controlling the construction machine, optical and/or acoustic and/or tactile signals can also be generated, which prompt the machine operator to manually intervene in the machine control.

In a road milling machine, the working device of which is a milling roller which is vertically adjustable relative to the ground, the control unit advantageously comprises an arithmetic and evaluation unit which is configured such that a comparison is made between the position of the working region of the milling roller and the position of the object in the reference system which is independent of the movement of the construction machine, the control unit being configured such that signals are generated on the basis of the proximity of an object to the working region of the working device. These signals can be control signals for actuating the milling roller or the lifting cylinders so that the milling roller is raised or lowered. The signals can, however, also be optical and/or acoustic and/or tactile signals for generating an alarm, for example, so that the machine operator can manually intervene in the machine control, for example so that said operator can raise or lower the milling roller or stop the construction machine. In this context, proximity is understood to mean when the area of the working region of the milling roller and the surface area occupied by the object in the terrain are next to one another, above one another, or when the area and surface area intersect. During the advance of the construction machine, the milling roller is raised when the front boundary line of the area of the working region of the milling roller is at a predetermined distance in front of the rear boundary line of the surface area of the object. If the rear boundary line of the area of the working region is at a predetermined distance behind the front boundary line of the surface area of the object, the milling roller is lowered again so that the object, for example the manhole cover, and the milling roller cannot get damaged.

The construction machine preferably comprises a device for determining position and orientation data, which describe the position and orientation of the image capturing unit provided on the construction machine and the position of the working device, moving on the terrain, in the reference system which is independent of the movement of the construction machine. This device does not have to determine the positions of the image capturing unit and the working device directly, but rather the position determination of the construction machine is sufficient for determining said positions, since there is a fixed spatial relationship between the construction machine on the one hand and the image capturing unit and working device on the other.

The device for determining the position and orientation data can comprise different systems. Preferably, the device for determining the position and orientation data comprises a global navigation satellite system (GNSS), by means of which all relevant data are provided. The global navigation satellite system (GNSS) preferably comprises a first and a second GNSS receiver for decoding GNSS signals from the global navigation satellite system (GNSS) and correction signals from a reference station, the first and second GNSS receivers being arranged in different positions on the construction machine. By means of the first and second GNSS receivers, the measurement accuracy can be increased and the orientation detected. Instead of a global navigation satellite system (GNSS), the position and orientation can also be determined by a system independent of satellites, for example a tacheometer. Systems of this type, which allow the position and orientation data to be determined with great accuracy, belong to the prior art.

Instead of the second GNSS receiver of the global navigation satellite system (GNSS) or instead of the second satellite-independent system, an electronic compass K can also be provided for detecting the orientation. However, the compass can also be omitted when the orientation is computed. The orientation can be computed by the position of a reference point being defined at successive points in time and the direction of movement being defined from the change in location. The current steering angle, which defines the orientation of the construction machine, of the front and/or rear axle of the construction machine at the corresponding points in time can also be included in the computation of the orientation in order to increase the accuracy.

The position does not have to be determined directly at a reference point located on the image capturing unit or the working device. A position determination at any reference point on the construction machine is sufficient, since the position of the image capturing unit, i.e. the position of the image plane of the image sensor of the image capturing unit, and the position of the working device on the machine are known.

The project data can be recorded and the terrain altered or a structure installed on the construction site, without the data having being processed previously in an office. Any geodesic reference system which does not change between the data recording and the working of the terrain can be provided for the recording of the data and the control of the construction machine.

If the construction machine has a device which holds the machine frame, independently of the course of the terrain, in a horizontal orientation or in an orientation parallel to the surface of the terrain, only the direction of travel of the construction machine has to be defined in order to define the orientation of the image capturing unit, since the image capturing unit, which is rigidly attached to the machine frame of the construction machine, moves with the construction machine over the terrain and the viewing angle does not change with respect to the horizontal or with respect to the surface of the terrain during the advance of the machine. The identification and georeferencing of the objects can be simplified by the image plane of the image capturing unit being oriented in parallel with the horizontal or with respect to the surface of the terrain, so that the terrain is represented in plan view.

BRIEF DESCRIPTION OF THE DRAWINGS

Various embodiments of the invention will be explained in more detail below with reference to the drawings, in which FIG. 2A is a side view of an embodiment of a road milling machine, FIG. 2B is a plan view of the road milling machine of FIG. 2A.

DETAILED DESCRIPTION

Figure 1A:
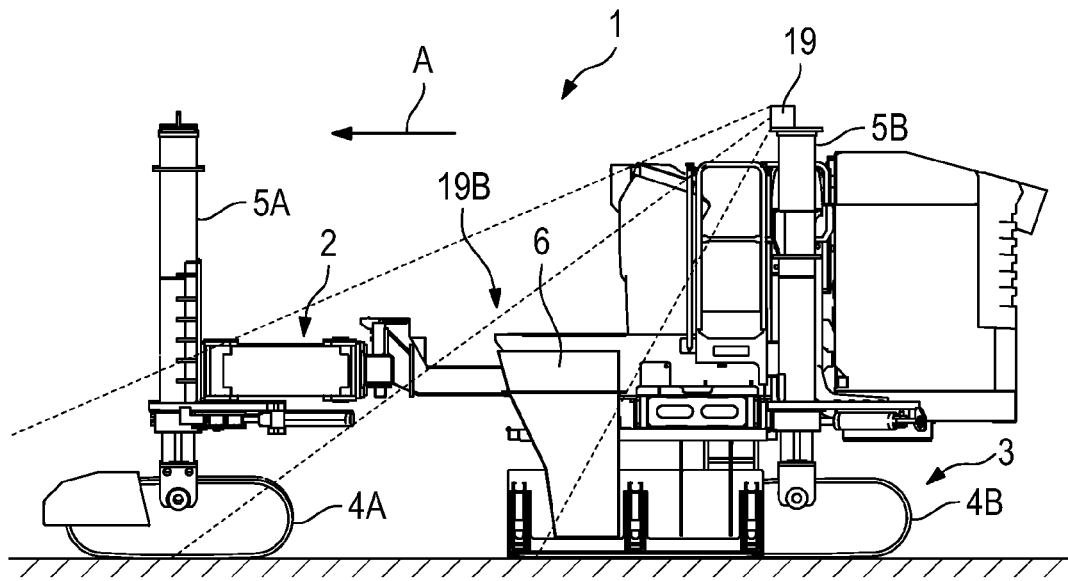
FIG. 1A is a side view of an embodiment of a slipform paver.
Figure 1B:
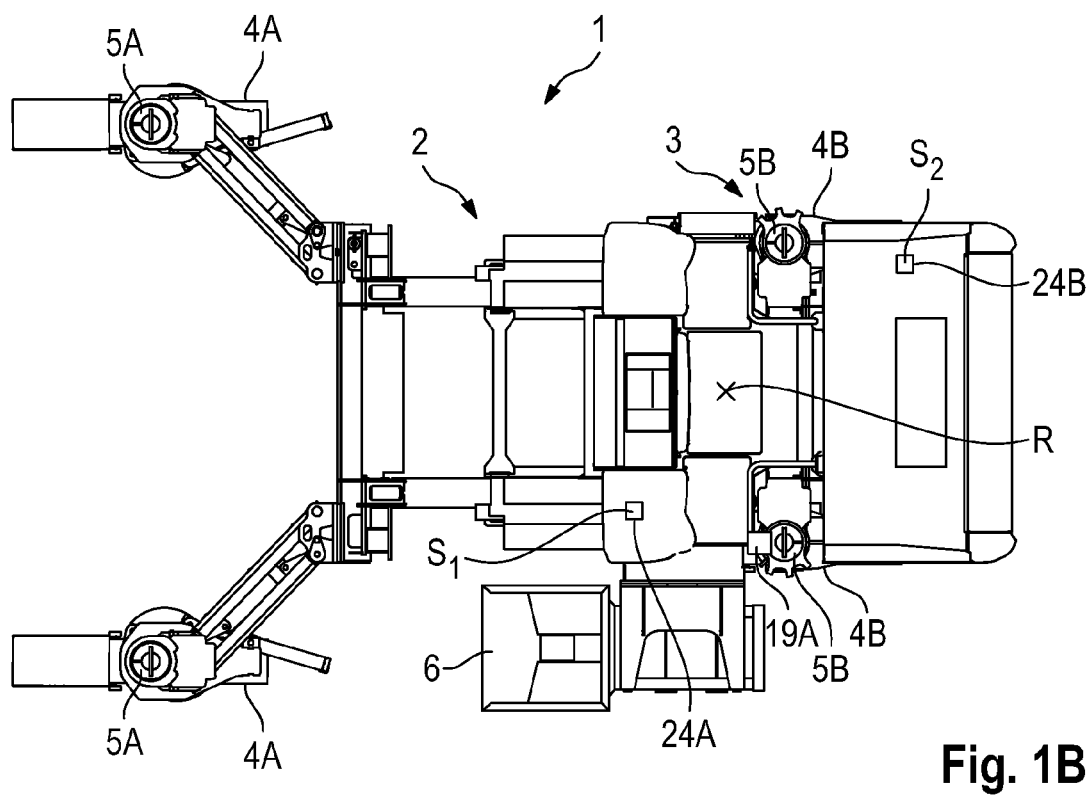
FIG. 1B is a plan view of the slipform paver of FIG. 1A.

FIGS. 1A and 1B are a side view and a plan view of a slipform paver as an example of a self-propelled construction machine. A slipform paver of this type is described in detail in EP 1 103 659 B1. Since slipform pavers per se belong to the prior art, only the components of the construction machine that are relevant to the invention will be described here.

The slipform paver 1 comprises a machine frame 2 which is carried by a chassis 3. The chassis 3 comprises two front and two rear caterpillar tracks 4A, 4B, which are attached to front and rear lifting columns 5A, 5B. The working direction (direction of travel) of the slipform paver is denoted by an arrow A.

The steerable caterpillar tracks 4A, 4B are part of the drive device of the slipform paver for carrying out translational and/or rotational movements of the construction machine on the terrain. The slipform paver can be moved forwards and backwards by means of the caterpillar tracks 4A, 4B. By raising and lowering the lifting columns 5A, 5B, the machine frame 2 can be moved relative to the ground in terms of height and inclination. The construction machine thus has three translational degrees of freedom and three rotational degrees of freedom.

The slipform paver 1 has an apparatus 6 (only shown by way of indication) for moulding concrete, which is referred to in the following as a concrete trough. The concrete trough 6 is part of the working device of the slipform paver for installing a structure of a predetermined shape on the terrain.

As a further example of a self-propelled construction machine, FIGS. 2A and 2B show a road milling machine, the same reference numerals being used for corresponding parts. The road milling machine 1 also comprises a machine frame 2 which is carried by a chassis 3. The chassis 3 again comprises front and rear caterpillar tracks 4A, 4B, which are attached to front and rear lifting columns 5A, 5B. The road milling machine has a working device for altering the terrain. The device in this case is a milling device 6 comprising a milling roller (not visible in the figures) equipped with milling cutters. The material to be milled is transported away by a conveyor device F.

Figure 3:
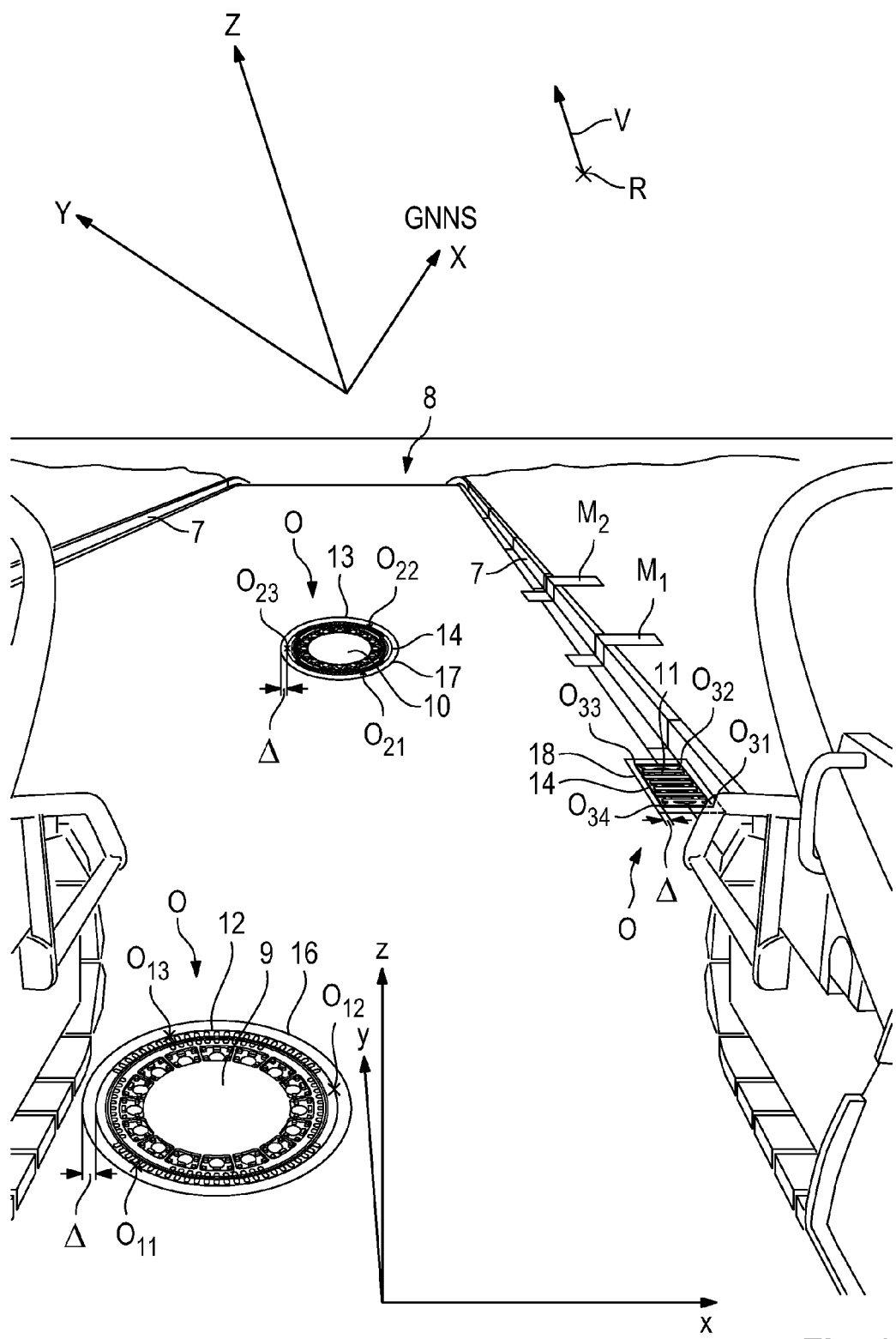
FIG. 3 shows the road surface to be worked by the road milling machine.

The road surface to be worked by a road milling machine is shown in FIG. 3. A road 8 delimited to the side by curbs 7 runs on the terrain. In this embodiment, the project consists in milling away the surface of the road. In the process, account has to be taken of the fact that certain objects O are located on the road, for example manhole covers in the center of the road surface and water inlets at the side of the road surface. FIG. 3 shows two manhole covers 9, 10 and one water inlet 11, over which the road milling machine travels when milling away the road surface. However, the view in FIG. 3 does not correspond to the field of view of the machine operator. The machine operator in the cab of the construction machine cannot see the objects O on the road since they are located either directly in front of the construction machine or below the machine. In particular, the machine operator cannot see the manhole cover when the milling roller is just a short distance in front of the manhole cover, i.e. precisely at the time when the machine operator has to raise the milling roller. However, this region also cannot be monitored by a camera in the milling roller housing owing to the material that is being milled flying about.

Since the machine operator cannot see the manhole cover, in practice side markings are applied at the level of the manhole cover, as denoted in FIG. 3 by $M_1$ and $M_2$. These markings are intended to allow the machine operator or another person to see the position of the manhole cover so that the milling roller can be raised in good time. However, markings of this type are not required with the construction machine according to the invention.

The circular manhole covers 9, 10 can be clearly delineated by three reference points $O_{11}$, $O_{12}$, $O_{13}$ and $O_{21}$, $O_{22}$, $O_{23}$ on the circular contour of the manhole cover. The rectangular water inlets can be delineated by four reference points $O_{31}$, $O_{32}$, $O_{33}$, $O_{34}$ at the corners of the water inlet. The contours 12, 13, 14 define the surface areas occupied by the objects O in the terrain.

Figure 4:
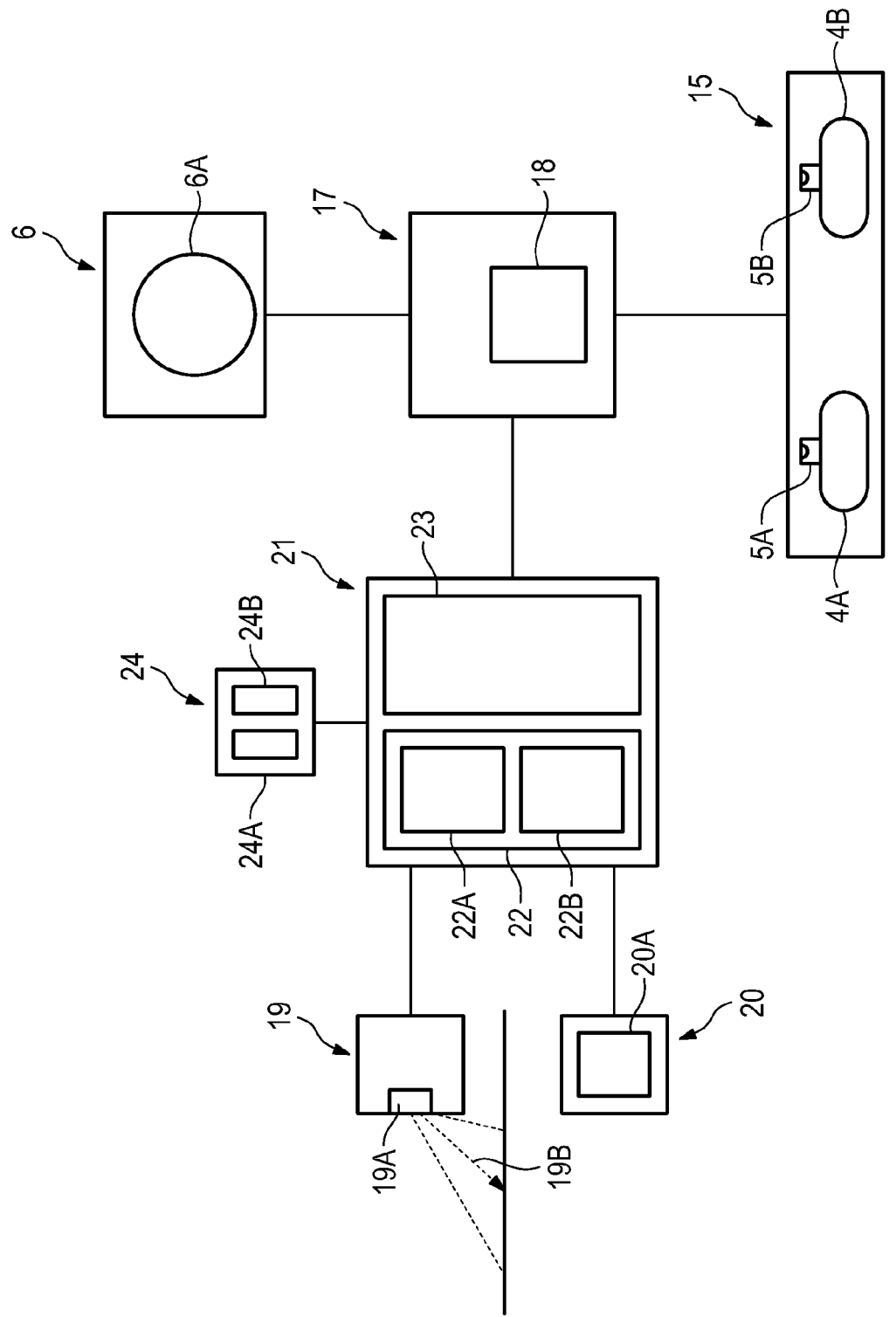
FIG. 4 is a schematic view of the relevant components of the construction machine according to the invention.

FIG. 4 is a schematic view of the components of the construction machine which are relevant to the invention, these being denoted by the same reference numerals as in FIGS. 1A, 1B, 2A and 2B.

The construction machine, which is a road milling machine in the present embodiment, has a drive device 15 having steerable front and rear wheels or caterpillar tracks 4A, 4B and lifting columns 5A, 5B so that the construction machine can carry out translational and rotational movements on the terrain and the machine frame 2 can be raised or lowered. To alter the terrain, the road milling machine comprises a working device 6 having a vertically adjustable milling roller 6A, which has a predetermined working region. The drive device 15 and the working device 6 are controlled by a central control unit 17 which comprises an arithmetic and evaluation unit 18.

In addition, the construction machine has an image capturing unit 19 which comprises at least one camera system 19A which is arranged on the machine frame 2 and with which an image can be recorded of a portion of the terrain to be worked, i.e. the road surface together with curbs, manhole covers and water inlets. The camera system 19A records a portion of the terrain which is located in front of the working region of the working device 6, in particular the milling roller, in the working direction A. At least part of this terrain portion cannot be seen by the machine operator in the cab.

The camera system 19A has a defined external and internal orientation. The location of the camera system 19A on the terrain and the viewing direction 19B thereof define the external orientation and the imaging-relevant parameters of the camera define the internal orientation.

In the following, the location of the camera system 19A on the terrain, which location constantly changes when the construction machine is moving, will be referred to as the position of the camera system and the viewing direction will be referred to as the orientation of the camera system. When the construction machine moves on the terrain, the position and orientation of the camera system in a reference system which is independent of the movement of the camera constantly change, since the camera system is rigidly mounted on the machine frame. The reference system which is independent of the camera system is referred to in FIG. 3 by (X, Y, Z). By contrast, the position and orientation of the camera system do not change relative to the machine frame.

The camera system can comprise one camera or two cameras (stereo camera system). If, when an image is captured by a camera, a three-dimensional scene is represented on the two-dimensional image plane of the camera, the result is a clear correlation between the coordinates of an object, the coordinates of the image of the object on the image plane, and the focal length of the camera. However, depth information is lost in the two-dimensional representation.

For the invention, it is sufficient for the camera system to only comprise one camera, since in practice the curvature of the terrain surface in the image detail captured by the camera can be ignored. In addition, only two-dimensional scenes are relevant to the invention, i.e. the contours of the objects in a plane (terrain surface). However, the invention is not limited thereto.

To record three-dimensional scenes and/or to take the curvature of the terrain surface into account, the at least one camera system of the image recording unit can also be a stereo camera system comprising two cameras which are arranged in an axially parallel manner at a predetermined horizontal spacing, in order to be able to obtain the depth information from the disparity according to the known methods.

Figure 5:
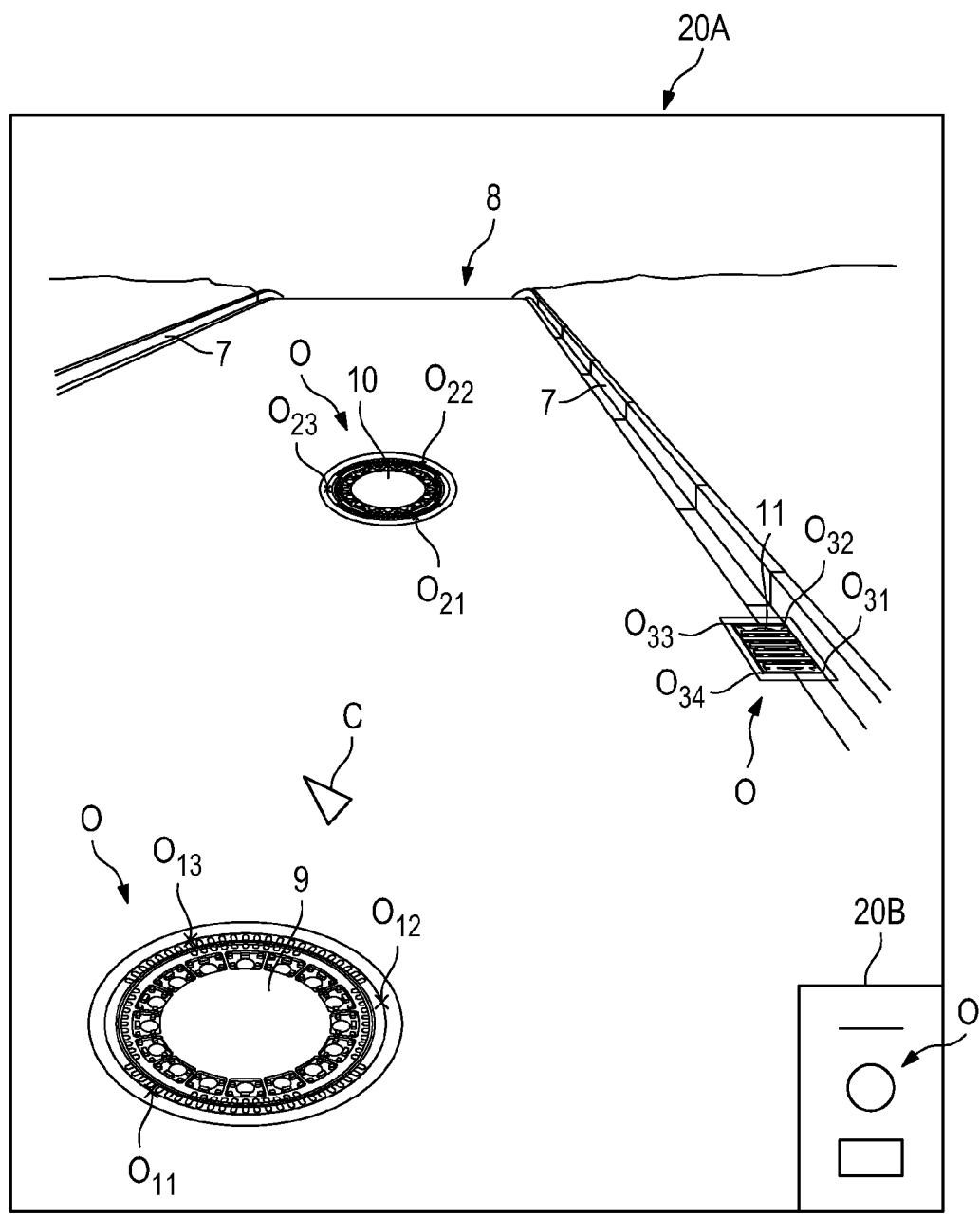
FIG. 5 shows the image detail of the terrain as displayed on the display unit of the construction machine.

The construction machine further has a display unit 20 having a display 20A on which a predetermined image detail of the image captured by the camera 19A is displayed. FIG. 5 shows the display 20A of the display unit 20, on which display the machine operator can see the portion of the terrain relevant to the building project. If the camera system is a stereo camera system, three-dimensional images can also be displayed on the display unit 20 by means of the known methods. In the following, the camera system will also be referred to as a measuring camera or camera for the sake of simplicity.

By means of the measuring camera 19A, the image capturing unit 19 creates a photogrammetric image of the terrain. For measurement purposes, the image data of the image capturing unit 19 are processed in a data processing unit 21. The data processing unit 21 comprises an identification unit 22 and a referencing unit 23, which will be described in more detail in the following.

To determine the position and orientation of the construction machine and thus also the position and orientation (viewing direction) of the camera 19A and the position of the working region of the working device 7 in the coordinate system (X, Y, Z) which is independent of the position and orientation of the construction machine, the construction machine has a device 24 which provides position and orientation data of the construction machine, which data can relate to any reference point R on the machine frame of the construction machine (FIG. 1B and FIG. 2B). The position and orientation (working direction) of the construction machine can, for example, be described by a vector V in a GNSS coordinate system, the origin of which is located on the reference point R of the machine (FIG. 3). In the present embodiment, the device 24 comprises a first GNSS receiver 24A and a second GNSS receiver 24B, which are arranged in different positions S1, S2 on the construction machine (FIG. 1B and FIG. 2B). In order to determine the position and orientation of the construction machine, the first and second GNSS receivers 24A, 24B decode the GNSS signals from the global navigation satellite system (GNSS) and correction signals from a reference station. Instead of the second GNSS receiver 24B, however, an electronic compass can also be provided for detecting the orientation of the construction machine. The compass can also be omitted if the orientation of the construction machine, i.e. the direction in which the construction machine moves, is computed from the continuous position and orientation data, while optionally taking account of the adjusted steering angle or other machine parameters.

The position and orientation (viewing direction 19B) of the camera 19A is also fixed together with the position and orientation of the construction machine in the GNSS coordinate system (X, Y, Z) which is independent of the movement of the construction machine. Since the position of the camera on the machine frame is known, position and orientation data containing information regarding the position and orientation of the camera 19A in the GNSS coordinate system (X, Y, Z) which is independent of the construction machine can be computed from the position and orientation data of the construction machine, which data can relate to any reference point R on the machine frame of the construction machine.

In the present embodiment, the central control unit 17 of the construction machine is configured in such a way that, during the advance of the construction machine, the machine frame 2 is always aligned in a particular manner, in particular in a horizontal orientation or in an orientation parallel to the surface to be worked. A control unit of this type is described in DE 10 2006 062 129 A1. As a result, during the advance of the machine, the viewing angle 19B of the camera 19A does not change relative to the GNSS coordinate system (X, Y, Z) which is independent of the movement of the construction machine. The evaluation of the image data is simplified as a result. If the orientation of the machine were to change, however, it goes without saying that a viewing angle 19B of the camera 19A, which also changes together with the orientation of the machine, can also be taken into account because the orientation of the machine, e.g. relative to the horizontal or relative to the surface of the terrain, is known.

Position data containing information regarding the position of the working region of the working device, the spatial dimensions of which are known, are also computed from the position and orientation data of the construction machine. For example, the working region of the milling roller is defined by the known dimensions thereof and the preset milling depth. The working region of a concrete trough is also defined by the dimensions thereof, which correspond to the dimensions of the structure to be installed.

The position and orientation data of the construction machine as provided by the GNSS system are received by the data processing unit 21, which continuously computes the current position and orientation data of the camera 19A and the position data of the working region of the working device 6.

At the start of the building project or while the building project is being implemented, the machine operator of the road milling machine can see the objects O located in the road surface to be milled away, for example the manhole covers 9, 10, on the display 20A of the display unit 20. The identification unit 22 of the data processing unit 21 is responsible for identifying these objects O. In the process, the machine operator can assist the identification unit 22 by inputting information. For this purpose, the identification unit 22 has an input unit 22A. In addition, the identification unit 21 can also comprise an image recognition unit 22B.

The input unit 22A of the identification unit 22 is designed such that the machine operator can mark certain object points $O_{11}$, $O_{12}$, $O_{13}$, $O_{21}$, $O_{22}$, $O_{23}$, $O_{31}$, $O_{32}$, $O_{33}$, $O_{34}$ (FIG. 3) in the image displayed on the display unit 20 (FIG. 5). The object points can be marked on the display 20A by clicking thereon using a cursor C of a mouse, for example. If the display unit 20 is formed as a touch screen, the object points can also be marked by the finger.

In addition, the input unit 22A is designed such that the machine operator can select between certain predetermined objects O, for example between a duct cover or a water inlet. The machine operator can make this selection using the known techniques, for example by clicking in a menu bar 20B using a cursor C of a mouse. The known dimensions of the objects O in question are stored in a memory of the identification unit 22.

In one embodiment, the machine operator uses a mouse click to select the relevant object O in the menu bar 20B, for example a manhole cover 9, 10, and uses the cursor of the mouse to mark object points $O_{nm}$ located on the contours of the objects O (9, 10) by clicking thereon. For example, if the machine operator selects a manhole cover, he can mark the object points $O_{11}$, $O_{12}$, $O_{13}$, $O_{21}$, $O_{22}$, $O_{23}$ of the manhole cover 9, 10 or if the operator selects a water inlet 11, he can mark the object points $O_{31}$, $O_{32}$, $O_{33}$, $O_{34}$ of the water inlet. As a result, the surface areas occupied by the objects O in the image plane are clearly defined. It is possible, however, for more than three or four object points, respectively, to also be selected. A distinction can also be made between a manhole cover and a water inlet solely by means of the number of successive mouse clicks, i.e. three mouse clicks for marking the three object points of a manhole cover and four mouse clicks for marking the four object points of a water inlet.

Another embodiment provides for an identification of the objects O even without the assistance of the machine operator. In this embodiment, the identification unit 22 comprises an image recognition unit 22B, by which the individual objects O are automatically recognised. The image recognition can be carried out using the known pattern recognition methods.

Lastly, the input unit 22A and the image recognition unit 22B can also interact, it being possible for the marking of object points $O_{nm}$ to assist with the image recognition, as a result of which the accuracy when identifying the objects can be increased as a result of the redundancy. To identify the objects O, all available input and selection techniques can be used.

Once the individual objects have been identified, the shape of the objects O, for example a circle or a rectangle, and the position of the objects in a reference system are defined, which reference system is based on the construction machine, in particular on the camera. This coordinate system is denoted by (x, y, z) in FIG. 3.

The coordinate system (x, y, z) that is dependent on the movement of the construction machine on the terrain can be a three-dimensional or two-dimensional coordinate system. FIG. 3 shows the general case of a coordinate system having an x-axis, a y-axis and a z-axis. However, if the curvature of the terrain surface is to be ignored and only two dimensional objects are to be considered, a two-dimensional coordinate system is sufficient. However, this requires the x/y plane to be parallel to the terrain surface, which is assumed to be flat, as will be assumed in the following.

The identification unit 22 is configured such that a spatial data set $[(X_1, Y_1, Z_1), (X_2, Y_2, Z_2), (X_3, Y_3, Z_3) \ldots (X_n, Y_n, Z_n)]$ containing information regarding the position of the identified objects in the GNSS reference system (X, Y, Z) which is independent of the movement of the construction machine is determined from the image data of the individual objects O using the position and orientation data from the camera 19A. As a result, the position of the objects O is defined in the same coordinate system in which the position of the working region of the working device 6 is also defined. In this stationary coordinate system, the objects will not move during the advance of the construction machine while the working region of the working device moves.

The spatial data set $[(X_1, Y_1, Z_1), (X_2, Y_2, Z_2), (X_3, Y_3, Z_3) \ldots (X_m, Y_n, Z_n)]$ is preferably generated by the object points of the individual objects being allocated image coordinates $(x_n, y_n, z_n)$ which describe the location and surface area of the objects in the reference system (x, y, z) which is dependent on the movement of the construction machine, and by the image coordinates being allocated location coordinates $(X_n, Y_n, Z_n)$ in the GNSS reference system (X, Y, Z) which is independent of the movement of the construction machine. For this purpose, the known methods for georeferencing can be used, by means of which the associated geodata are determined at particular image points on the image, each image point on the image (pixel) being allocated a particular spatial location on the earth's surface. Since the objects O, the shape of which is known, can be clearly delineated by just a few object points $O_{nm}$, only a few image points (pixels) are also required for determining the image coordinates. However, it is also possible to delineate the objects by means of all the image points (pixels) which represent the object on the display 20A of the display unit 20.

Following the data transformation, both the position of the object(s) O and the position of the working region of the working device 6 in the GNSS reference system (X, Y, Z) which is independent of the movement of the construction machine are known.

Figure 6A:
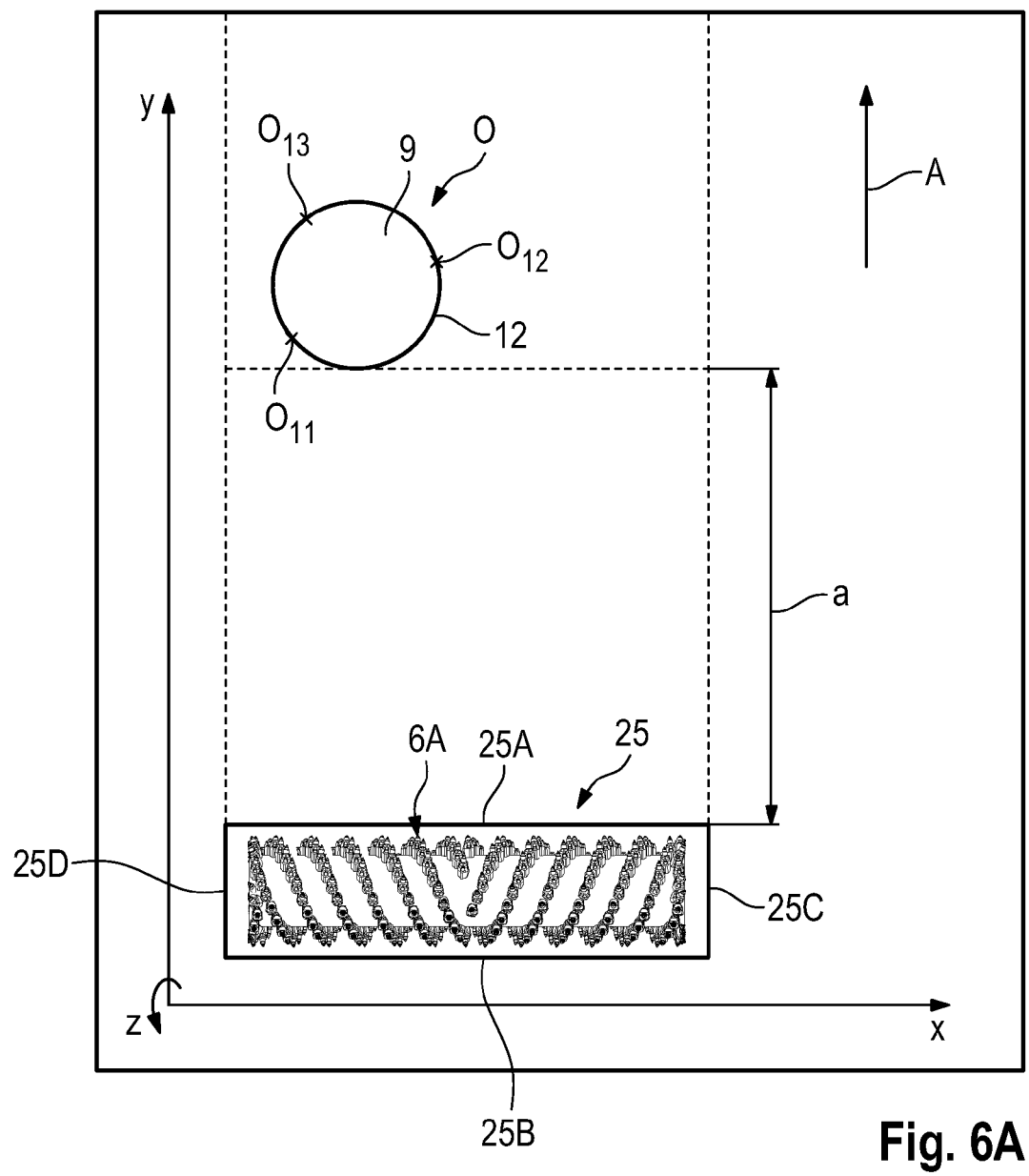
FIG. 6A shows an object and the working region of a working device of the construction machine in the X/Y plane of the stationary reference system (X, Y, Z) at a first point in time, at which the working device is moving towards the object.

For the case of a road milling machine in the GNSS reference system (X, Y, Z), FIG. 6A shows the position of the working region 25 of the milling roller 6A and the position of a manhole cover 9, which is still located far in front of the working region of the milling roller in the working direction A, at a particular point in time during the advance of the milling machine, the milling machine moving towards the manhole cover. The manhole cover 9 is a circular area in the X/Y plane of the GNSS reference system (X, Y, Z).

The milling roller 6A comprises a rectangular working region 25, which is defined by the geometric dimensions of the cylindrical roller body. The working region 25 is delimited by a boundary line 25A, which is at the front in the working direction, a rear boundary line 25B and lateral boundary lines 25C, 25D. These lines mark the region at which the milling tools of the milling roller 6A penetrate the surface of the terrain. The milling roller 6A can be raised or lowered by extending or retracting the lifting columns 5A, 5B, respectively, relative to the ground surface. When the milling roller 6A is raised or lowered, the rectangular working region 25 of the milling roller 6A changes. Raising the milling roller 6A leads to the distance between the front and rear boundary lines 25A, 25B being reduced, while lowering the milling roller leads to the distance between the front and rear boundary lines 25A, 25B being increased. Since the height of the milling roller 6A with respect to the ground and the geometric dimensions of the milling roller are known, the rectangular area of the working region 25 of the milling roller 6A in the X/Y plane of the GNSS reference system (X, Y, Z) can be computed. The manhole cover 9 is a circular area in the X/Y plane of the GNSS reference system (X, Y, Z).

Figure 6B:
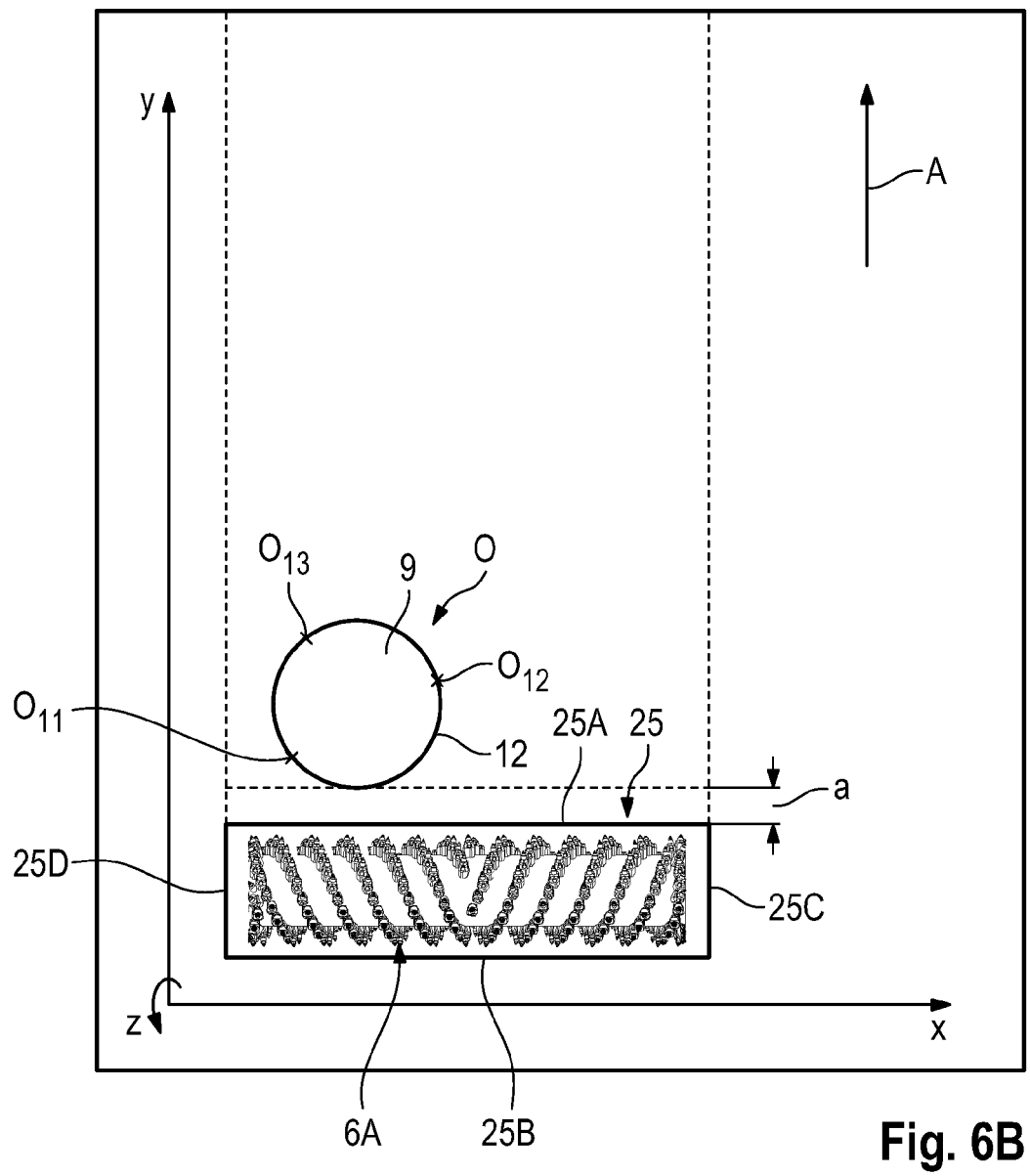
FIG. 6B shows an object and the working region of a working device of the construction machine in the X/Y plane of the stationary reference system (X, Y, Z) at a second point in time, at which the working device has reached the object.

FIG. 6B shows the position of the working region 25 of the milling roller 6A and the position of the manhole cover 9 located directly in front of the working region of the milling roller. The arithmetic and evaluation unit 18 of the control unit 17 is configured such that the position of the rectangular working region 25 of the milling roller 6A and the position of the circular manhole cover 9 in the GNSS reference system (X, Y, Z) are continuously compared with one another in order to determine the proximity of the rectangular area and the circular area. The control unit 17 of the road milling machine is configured such that control signals are generated on the basis of the proximity of an object O to the working region 25 of the milling roller 6A, so that the milling roller is raised or lowered. FIG. 6B shows how the front boundary line 25A of the working region 25 of the milling roller 6A reaches the contour 12 of the circular manhole cover 9. The distance between the milling roller 6A and the manhole cover 9 is denoted by a in FIGS. 6A and 6B. If the distance a between the milling roller and the manhole cover is smaller than a predetermined limit value Δ (FIG. 3), the control unit 17 generates a control signal for actuating the lifting columns 5A, 5B so that the milling roller is raised relative to the ground. As a result, the manhole cover and the milling roller cannot be damaged when the road milling machine travels over the manhole cover. If, once the machine has traveled over the manhole cover, the distance a between the rear boundary line 25B of the working region 25 of the milling roller 6A and the contour 12 of the circular manhole cover 9 is greater than a predetermined limit value Δ, the control unit 17 generates a control signal for lowering the milling roller 6A so that the milling operation is resumed.

The intervention in the machine control can also consist in the machine being stopped automatically. The machine operator can then raise the milling roller and restart the machine. It is also possible for the control unit 17 to generate an alarm signal so that an alarm is generated when a troublesome object O comes close to the working region 25 of the milling roller 6A.

In the following, an embodiment is described in which the construction machine, for example a road milling machine or a slipform paver, is controlled at a predetermined distance along a lateral boundary line, for example the construction machine is supposed to travel along a curb edge or a gutter which the machine operator can see on the display.

The machine operator can, for example, mark object points on a curb edge or a gutter in the image in order to identify a line extending through the object points. In the case of a straight curb edge, for example, the machine operator can select a straight line as the object and mark a start point and end point in the image in order to identify the straight line in the reference system (x, y, z) which is dependent on the movement of the construction machine.

Figure 7:
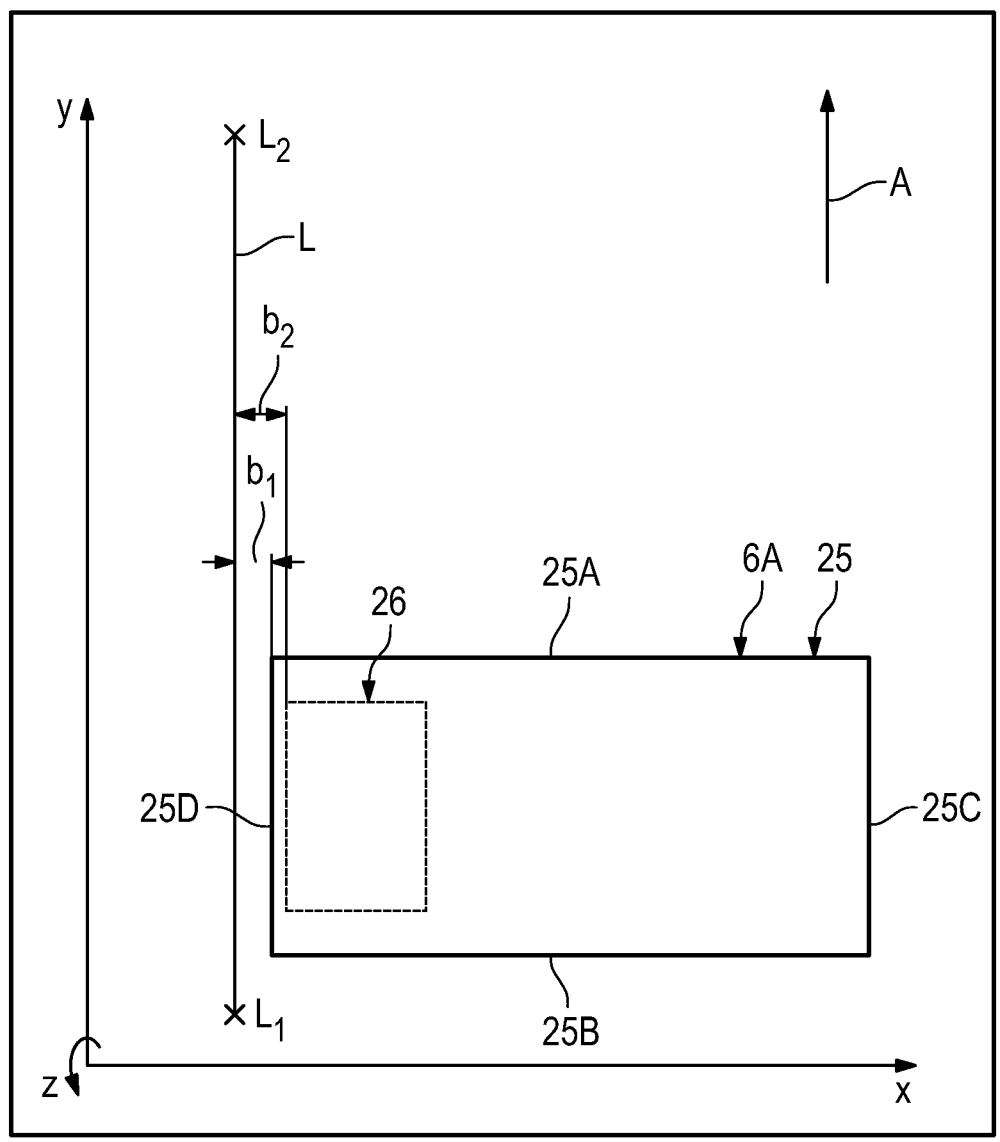
FIG. 7 shows an object and the working region of a working device of the construction machine in the X/Y plane of the stationary reference system (X, Y, Z), the construction machine moving alongside the object.

FIG. 7 shows the associated line L as the object in the X/Y plane of the GNSS reference system (X, Y, Z) which is independent of the movement of the construction machine, in that the arithmetic and evaluation unit 18 of the control unit 17 compares the position of the object (line) with the position of the working region of the working device. The start point and end point of the line L are denoted by $L_1$, $L_2$. For the case of a road milling machine, FIG. 7 shows the rectangular working region 25 of the milling roller 6A by means of a solid line, and for the case of a slipform paver, FIG. 7 shows the rectangular working region 26 of the concrete trough by means of a dashed line, i.e. the region of the terrain on which the structure, for example a guiding wall, is intended to be installed. The control unit 17 of the construction machine is configured such that control signals for actuating the drive device 6 are generated so that the drive device 15 carries out translational and/or rotational movements in such a way that, during the advance of the construction machine, the working region 25, 26 of the working device 6, for example the milling roller 6A or the concrete trough, is at a predetermined distance $b_1$ or $b_2$ from the line L (object). As a result, the construction machine follows the curb edge or the gutter so that the road next to the curb edge or gutter is milled away, or the guiding wall next to the curb edge or gutter is installed. During the advance of the construction machine, additional objects, for example a duct cover, can also be taken into account in the control of the construction machine in order to raise or lower the milling roller, for example.

The invention claimed is:

1. A self-propelled construction machine comprising:
a chassis comprising front and rear wheels or running gears in a working direction;
a working tool for working the terrain in a predetermined working region;
an image recorder configured to capture an image of the terrain;
a user interface comprising a display for displaying the captured image of the terrain, wherein the user interface is further configured to receive user input for marking one or more object points in the displayed image;
a data processor configured to
identify one or more objects represented in the displayed image based on at least one marked object point associated the one or more objects, and
determine a spatial data set containing information regarding a position of the identified one or more objects in a reference system which is independent of the movement of the construction machine,
wherein said spatial data set is determined from captured image data based on a position and orientation of the image recorder in the reference system; and
a controller configured to generate control signals, based on the determined spatial data set, for one or more of operations comprising actuation of the front and rear wheels or running gears for translational movements on the terrain, actuation of the front and rear wheels or running gears for rotational movements on the terrain, and actuation of the working tool in order to work the terrain.

2. The self-propelled construction machine of claim 1, wherein a first plurality of marked object points define a front boundary line in the terrain and a second plurality of marked object points define a rear boundary line in the terrain, and wherein the controller is configured to
compare a position of the working region of the working tool with at least one of the front and rear boundary lines, and
generate the control signals based on the comparison and a predetermined distance between the working region of the working tool and the at least one of the front and rear boundary lines during an advance of the construction machine.

3. The self-propelled construction machine of claim 1, wherein at least first and second marked object points define a lateral boundary line in a working direction of the construction machine, and wherein the controller is configured to
compare a position of the construction machine with the lateral boundary line, and
generate the control signals to maintain a predetermined distance between the construction machine and the lateral boundary line during an advance of the construction machine.

4. The self-propelled construction machine of claim 1, wherein the user interface is further configured to receive user input for selecting a particular object from a plurality of objects having a predetermined shape, wherein the object is identified based on the selection of both a particular object and the at least one marked object point.

5. The self-propelled construction machine of claim 1, wherein the data processor is further configured to identify one or more objects in the displayed image by recognizing one or more of the objects as having a predetermined shape.

6. The self-propelled construction machine of claim 1, wherein the data processor is further configured to allocate location coordinates in the reference system to image coordinates of one or more object points on the identified objects in the displayed image.

7. The self-propelled construction machine of claim 1, wherein the construction machine is a road milling machine, the working tool comprising a milling roller which is vertically adjustable relative to the ground in order to alter a predetermined portion of the terrain, and
the controller is configured to
compare a position of the working region of the milling roller and the position of at least one of the one or more identified objects in the reference system, and
generate control signals for one or more of operations comprising actuation of the front and rear wheels or running gears for translational movements on the terrain and actuation of the front and rear wheels or running gears for rotational movements on the terrain, based on the comparison and a predetermined distance between the working region of the working tool and the at least one object during the advance of the construction machine.

8. The self-propelled construction machine of claim 1, wherein the construction machine is a slipform paver, the working tool configured for moulding concrete, and
the controller is configured to
compare a position of the working region of the working tool and the position of at least one of the one or more identified objects in the reference system, and
generate control signals for one or more of operations comprising actuation of the front and rear wheels or running gears for translational movements on the terrain and actuation of the front and rear wheels or running gears for rotational movements on the terrain, based on the comparison and a predetermined distance between the working region of the working tool and the at least one object during the advance of the construction machine.

9. The self-propelled construction machine of claim 1, wherein the construction machine is a road milling machine, the working tool comprising a milling roller which is vertically adjustable relative to the ground in order to alter a predetermined portion of the terrain, and
the controller is configured to compare a position of the working region of the milling roller and the position of at least one of the one or more identified objects in the reference system, and generate control signals for actuating the milling roller based on a proximity of the at least one of the one or more identified objects to the working region of the milling roller.

10. The self-propelled construction machine of claim 1, further comprising a position and orientation sensor configured to provide position and orientation data, which describe the position and orientation of the image recorder and the position of the working region of the working tool in the reference system.

11. The self-propelled construction machine of claim 10, wherein the position and orientation sensor comprises a global navigation satellite system (GNSS).

12. A method of controlling a self-propelled construction machine which carries out translational and rotational movements on the terrain and works the terrain, the method comprising:

capturing an image of the terrain via an image recorder;

displaying the captured image of the terrain;

enabling user input for marking one or more object points in the displayed image;

identifying one or more objects represented in the image, based on at least one marked object point associated with the one or more objects;

determining, from the captured image, a spatial data set containing information regarding a position of the identified one or more objects in a reference system which is independent of the movement of the construction machine, based on a position and orientation of the image recorder in the reference system; and controlling one or more operations of the construction machine based on the determined spatial data set, the operations comprising one or more of translational movements on the terrain, rotational movements on the terrain and working of the terrain by the construction machine.

13. The method of claim 12, wherein the step of identifying one or more objects represented in the image comprises selecting a particular object from a plurality of objects of a predetermined shape, the object being identified based on the selection of the particular object and the at least one marked object point.

14. The method of claim 12, wherein the step of identifying one or more objects represented in the image comprises recognizing objects of a predetermined shape.

15. The method of claim 12, further comprising allocating location coordinates in the reference system to image coordinates of one or more object points on the identified objects in the displayed image.

16. The method of claim 12, further comprising comparing a position of a working region of a working tool associated with the construction machine and the position of the one or more objects in the reference system, and wherein controlling one or more operations of the construction machine based on the determined spatial data set comprises controlling the construction machine during the advance of the construction machine wherein the working region of the working tool is at a predetermined distance from the one or more objects.

17. The method of claim 12, further comprising comparing a position of a working region of a working tool associated with the construction machine and the position of the one or more objects in the reference system, and wherein controlling one or more operations of the construction machine based on the determined spatial data set comprises generating control signals for one or more of an intervention in the machine control based on a proximity of the one or more objects to the working region of the working tool and sounding an alarm on the basis of the proximity of the one or more objects to the working region of the working tool.

18. The method of claim 12, further comprising determining position and orientation data in the reference system, said position and orientation data describing one or more of a position and orientation of the image recorder and a position of a working region of a working tool associated with the construction machine, said position and orientation data determined via a global navigation satellite system (GNSS).

* * * * *